(12) United States Patent
Rowitch

(10) Patent No.: US 7,580,672 B2
(45) Date of Patent: Aug. 25, 2009

(54) SYNTHETIC PATH DIVERSITY REPEATER

(75) Inventor: Douglas Neal Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 569 days.

(21) Appl. No.: 10/637,950

(22) Filed: Aug. 7, 2003

(65) Prior Publication Data

US 2004/0266338 A1    Dec. 30, 2004

Related U.S. Application Data

(60) Provisional application No. 60/483,211, filed on Jun. 27, 2003.

(51) Int. Cl.
   *H04B 7/15* (2006.01)
(52) U.S. Cl. .................. 455/11.1; 455/7; 455/456.1; 455/16
(58) Field of Classification Search ............... 455/11.1, 455/101, 456.6, 7, 13.1, 456.1, 427, 18, 16, 455/12.1, 67.16, 445, 277.2, 561, 562, 404.2, 455/404.1, 456.5; 375/211; 370/315
See application file for complete search history.

(56) References Cited

U.S. PATENT DOCUMENTS

| | | | |
|---|---|---|---|
| 5,495,248 A | | 2/1996 | Kawase et al. |
| 5,930,293 A | * | 7/1999 | Light et al. ................. 375/211 |
| 6,108,558 A | * | 8/2000 | Vanderspool, II ........ 455/456.2 |
| 6,125,109 A | * | 9/2000 | Fuerter ....................... 370/315 |
| 6,345,188 B1 | * | 2/2002 | Keskitalo et al. ............ 455/561 |
| 6,445,904 B1 | * | 9/2002 | Lovinggood et al. ........... 455/7 |
| 6,463,574 B1 | * | 10/2002 | Culetu et al. ................... 716/8 |
| 6,580,705 B1 | * | 6/2003 | Riazi et al. .................. 370/347 |
| 7,016,688 B2 | * | 3/2006 | Simic et al. .............. 455/456.1 |

(Continued)

FOREIGN PATENT DOCUMENTS

GB     2237706 A    *    8/1991

(Continued)

OTHER PUBLICATIONS

International Search Report—PCT/US2004/020917, International Search Authority/EPO, Aug. 16, 2006 (2 pages).

(Continued)

*Primary Examiner*—Tan Trinh
(74) *Attorney, Agent, or Firm*—Bruce W. Greenhaus; Shyam K. Parekh

(57) ABSTRACT

A communication repeater for use in conjunction with a base transceiver subsystem (BTS) of a wireless communication system. The repeater expands the coverage area of the BTS and allows receivers to identify whether the source of a communication signal was directly from a BTS or was broadcast by a repeater. Identification of the signal source facilitates position determination, particularly in hybrid position determination systems. The repeater implements differential delay modulation of the transmitted signal. The repeater re-transmits the original BTS signal as well as a time delayed version of the signal. Additionally, the repeater introduces synthetic path diversity in the form of spatial diversity or polarity diversity to de-correlate the re-transmitted original signal from the time delayed signal. The repeater can broadcast the delayed signal with the same power as the re-transmitted original signal or can attenuate the delayed signal relative to the re-transmitted original signal.

43 Claims, 5 Drawing Sheets

U.S. PATENT DOCUMENTS

| | | |
|---|---|---|
| 2002/0155838 A1 | 10/2002 | Durrant et al. |
| 2003/0162550 A1* | 8/2003 | Kuwahara et al. ............ 455/456 |
| 2004/0097190 A1* | 5/2004 | Durrant et al. ................. 455/7 |
| 2004/0110469 A1* | 6/2004 | Judd et al. .................... 455/15 |
| 2005/0075139 A1* | 4/2005 | Shapira ................... 455/562.1 |
| 2005/0085267 A1* | 4/2005 | Lemson et al. ........... 455/562.1 |
| 2006/0172710 A1* | 8/2006 | Cahana et al. .............. 455/101 |

OTHER PUBLICATIONS

Written Opinion, PCT/US04/20917, International Searching Authority, United States, Aug. 16, 2006.

International Preliminary Examination Report, PCT/US04/20917, International Preliminary Examining Authority, United States, Aug. 27, 2007.

* cited by examiner

SYNTHETIC PATH DIVERSITY REPEATER

RELATED APPLICATIONS

This application claims priority from U.S. Provisional Application No. 60/483,211 filed on Jun. 27, 2003.

BACKGROUND OF THE INVENTION

1. Field of the Invention

The invention relates to electronic communication. More particularly, the invention relates to wireless communication repeaters.

2. Description of the Related Art

Wireless communication systems allow users to remain connected to a network without being tethered by a wire line. Mobile stations often connect to a communication network via fixed base stations. Multiple base stations may be distributed across a geographic region to enable a mobile station to connect with the communication network throughout the region. However, because the communication between base stations and mobile stations occurs over wireless communication links, many factors can affect the signal quality. For example, the signal transmitted from a base station to a physically distant mobile station at an edge of a coverage area served by the base station may be severely attenuated. Additionally, obstructions, such as buildings, terrain, and trees may severely attenuate a wireless communication link between a mobile station and a base station. Obstructions that result in coverage holes are common in dense urban environments. Thus, an ideal coverage area served by a base station may, unfortunately, include one or more holes in the coverage area.

One manner of extending the coverage area of a base station or of filling in coverage holes is to employ wireless communication repeaters. The repeaters operate as extensions to a base station to allow increased coverage without the cost or complexity associated with adding more base stations to the communication network. A repeater can receive a transmit signal from a base station and retransmit it, effectively repeating the received transmission. The repeater can also receive a signal transmitted by a mobile station and retransmit it to the base station.

Using repeaters to extend the coverage areas of a base station typically does not pose a problem in systems where timing or placement of the signal sources is not a critical component of the communication link. However, in more complex communication systems, signal timing and the position of the originating source are critical.

For example, in a Time Domain Multiple Access (TDMA) communication system the time slot assigned to a communication link is related to the time delay for a signal to traverse the path from the transmitter to the receiver. A receiver in a TDMA system would thus need to know if the received signal originated from a base station or a repeater.

Additionally, some wireless communication systems, such as wireless telephone systems, implement position determination. Indeed, in the United States, enhanced emergency wireless service having the capability of determining the location of a handset has been mandated for wireless phone providers. Wireless service providers, in conjunction with equipment manufacturers, have devised a variety of position determination systems that are able to provide the location of a mobile device, such as a portable handset.

However, position determination techniques used in wireless phone systems often use the position of the stationary signal source in determining the position of the mobile station. A functional block diagram of a typical wireless communication system 100 is shown in FIG. 1. The wireless communication system 100 includes at least one base station 102 in communication with a repeater 112. A wired communication link 110 is shown coupling the base station 102 to the repeater 112. It is also common for a wireless communication link to be used to couple the base station 102 to the repeater 112. A mobile station 150 is shown in communication with the repeater 112.

The repeater 112 merely acts as an intermediary between the base station 102 and the mobile station 150. The mobile station 150 is unable to determine if transmit signals are received from the repeater 112 or directly from the base station 102. Thus, a mobile station 150 may determine that it is positioned a distance, R, from the base station 102 when the mobile station is actually positioned the distance, R, from the repeater 112. The mobile station 150 may determine its range from a signal source using, for example, the Pseudo Noise (PN) code transmitted by a Code Division Multiple Access (CDMA) signal source.

In some position determination systems, a latitude, longitude, and time calibration for the point of transmission are used in determining the position of the mobile station 150. Ambiguity in the source of a signal creates problems for position determination solutions. The position determination system may determine an inaccurate location of the mobile station 150, or the ambiguity in signal source may result in an inability of the position determination system to locate the mobile station 150.

What is desirable is a new repeater that augments the signal received from the base station before retransmitting it. It is desirable for a mobile station to be able to determine whether a base station or a repeater transmitted the signal. Additionally, if a repeater transmitted the signal, the mobile station should be able to identify a particular repeater where more than one repeater is used with the same base station. The augmented repeater signal should allow a mobile station, or some other receiver, to resolve signal source ambiguity in order to support position determination.

SUMMARY OF THE INVENTION

A repeater and method of repeating a signal are disclosed. The repeater differentially delay modulates the received signal and transmits an on-time and delayed version of the received signal. The repeater can also introduce synthetic path diversity by introducing antenna polarization diversity or by introducing spatial diversity in antennas. The repeater can implement a delay function in a differential delay modulator that introduces a specified delay in the delay path. The repeater can be identified by the delay function associated with the repeater signals.

In one aspect, the repeater comprises a differential delay modulator configured to receive a repeater signal and generate an on-time signal and a delayed signal and a transmitter coupled to the differential delay modulator and configured to wirelessly transmit the on-time signal and the delayed signal to a mobile station. The repeater can also include first and second antennas that broadcast the on-time and delayed signals, respectively. The first and second antennas can be configured to provide path diversity. The second antenna can have a polarization that is substantially orthogonal to a polarization of the first antenna. The second antenna can be spatially separated from the first antenna by a distance sufficient to introduce spatial path diversity. The spacing can be proportional to the wavelength, $\lambda$, where $\lambda$ represents a wavelength of a frequency in the repeated signal band.

The differential delay modulator can include a signal splitter and a delay module. The delay module can implement a delay function that can be used to identify the repeater. The delay function can be less than, equal to, or greater than one CDMA chip period.

In another aspect a method of repeating signals comprises wirelessly receiving a signal, generating an on-time version, generating a delayed version, introducing path diversity between the on-time and delayed versions, and wirelessly transmitting the on-time and delayed versions. The delayed version can be generated using a fixed delay or a variable delay. The method can also include varying an amplitude of the on-time version relative to the delayed version.

BRIEF DESCRIPTION OF THE DRAWINGS

The above-described aspects and other aspects, features and advantages of the invention will be apparent upon review of the following detailed description and the accompanying drawings. In the drawings, like reference characters identify identical or functionally equivalent elements.

DETAILED DESCRIPTION OF THE PREFERRED EMBODIMENT

Figure 1:
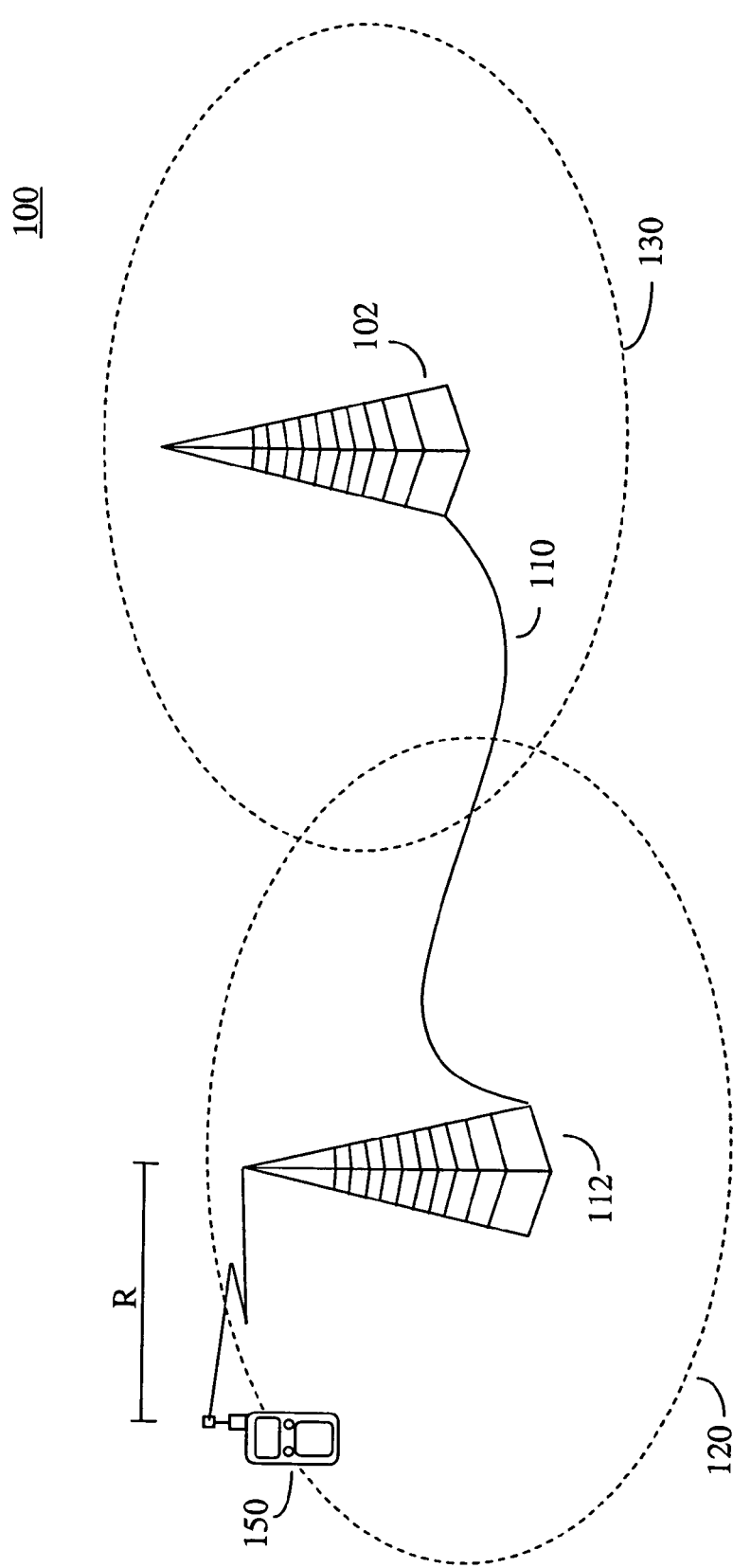
FIG. 1 is a prior art functional block diagram of a mobile unit in communication with a repeater.

A repeater, a method for repeating wireless communication signals, and a method for identifying repeaters in a wireless communication system are disclosed. It is advantageous for a mobile station to be able to identify whether the source of a signal is a base station or a repeater. The wireless communication can use the position of the signal source in determining the position of the mobile station. However, the mobile station needs to identify the source. In one embodiment, the repeater augments the signals received from a base station with a delayed version of the signals. The repeater retransmits the received base station signal as an on-time signal along with the delayed version. Different repeaters in a communication system may be assigned one of a predetermined number of delay functions. By using a preselected delay function, a repeater can identify itself without the need to transmit any data message that could reduce the system capacity. The mobile station can identify the delay function associated with a repeater and identify the signal source as a repeater without the repeater using any signal bandwidth in the communication system. The communication system can then use the location of the repeater in determining the position of the mobile station.

The predetermined delay functions can be constant delays or can be varying delays. The varying delay functions can be time varying delay functions. Additionally, multiple repeaters associated with the same base station can each have different delay functions identifying the particular repeater.

Additionally, the repeaters can introduce synthetic path diversity to improve receiver response in a CDMA system. The repeater can introduce synthetic path diversity by introducing diversity in the polarization of the on-time signal relative to the delayed signal. The repeater can transmit orthogonally polarized signals using separate orthogonally polarized antennae, or can transmit orthogonally polarized signals using a co-located antenna transmitting both antenna polarizations. Alternatively, the repeater can introduce synthetic path diversity by introducing spatial diversity in antennas used for the on-time signal and the delayed signal antenna. Other synthetic diversity methods or combinations of signal diversity methods can also be used.

Mobile stations can distinguish such repeaters from base stations as signal sources. Additionally, a mobile station can use the delay function associated with a repeater to identify a particular repeater as a signal source. The mobile stations may report a list of signal sources to the communication system. For example, the mobile station may list the signal sources in a position determination message communicated to a position determination entity in the wireless communication system. Operators of the wireless communication system can analyze the distribution of reported signal sources to determine a load placed on repeaters and base stations. For example, an operator may determine the loading of repeaters relative to host base stations as part of a determination of the usefulness of repeaters. Additionally, the operator may determine a distribution of users across repeater and base station coverage areas, overlaps in coverage, and other network loading information. The operator can then use the network loading information to balance the loads placed on base stations and repeaters. Additionally, an operator can use the network loading information to determine a need for additional repeaters.

Figure 2:
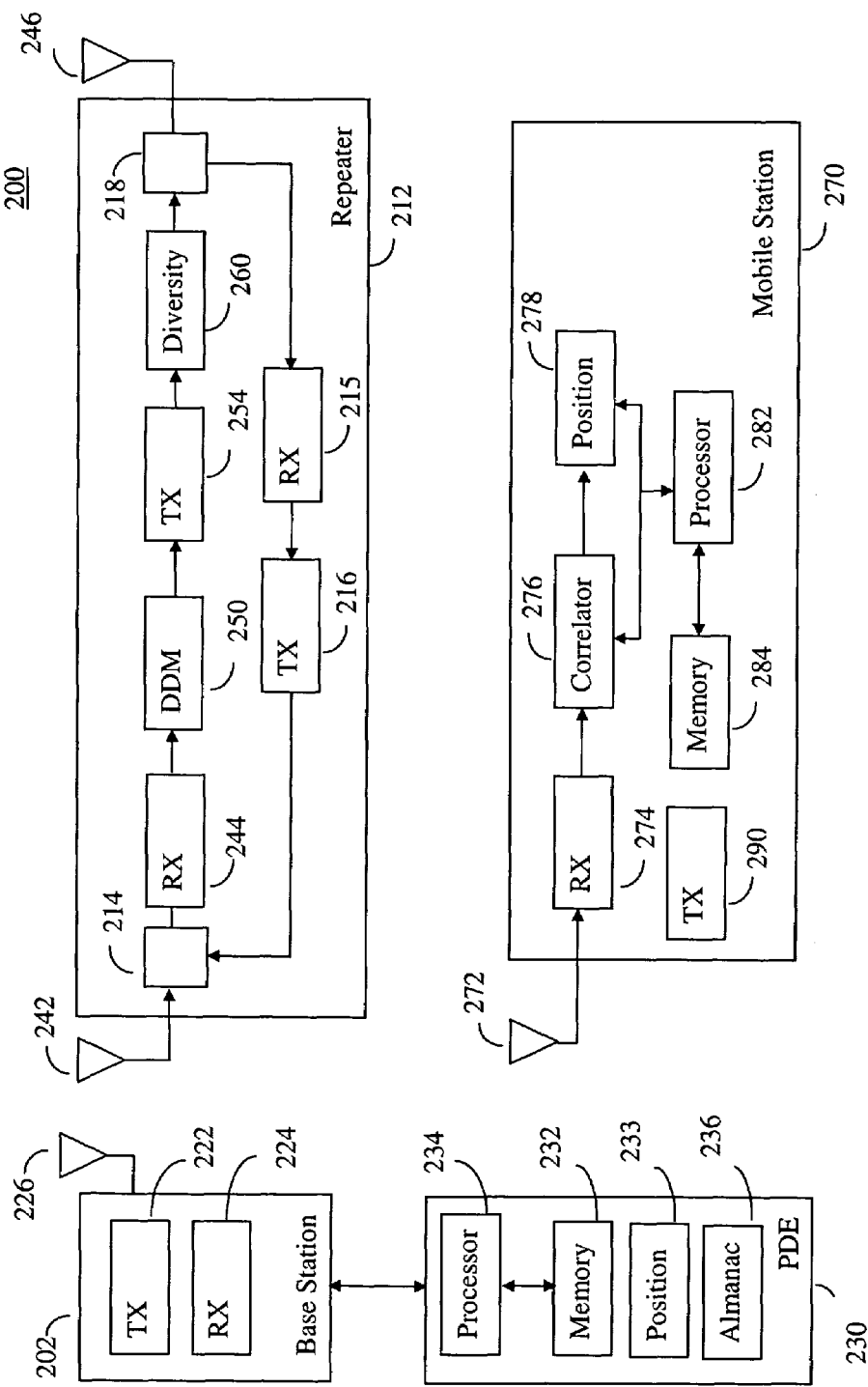
FIG. 2 is a functional block diagram of a communication system including a repeater with synthetic path diversity.

FIG. 2 is a functional block diagram of a wireless communication system 200. The wireless communication system 200 can be, but is not limited to, a wireless telephone system. The wireless telephone system can be, for example a Code Division Multiple Access (CDMA) wireless telephone system. The wireless communication system 200 can be configured to determine the position of a user, such as a mobile station 270. The wireless communication system 200 can determine the position of the mobile station 270 using a variety of techniques, such as, but not limited to, Global Positioning System (GPS), Assisted GPS (A-GPS), Time Distance Of Arrival (TDOA), Advanced Forward Link Trilateration (AFLT), Enhanced Observed Time Difference (E-OTD), Observed Time Difference of Arrival (OTDOA), a hybrid position determination system that uses a combination of position determination systems, and the like.

The wireless communication system 200 is depicted as a wireless telephone system having a single base station 202, one repeater 212 associated with the base station 202, and one mobile station 270 in communication with either the base station 202 or the repeater 212. Position Determination Entity 230 (PDE) is in communication with the base station 202.

The wireless communication system 200 is not limited to a single base station 202. Additionally, zero, one, or more repeaters 212 may be associated with a base station 202. Additionally, the system 200 typically simultaneously supports more than one mobile station 270 or user. Each base station 202 or repeater 212 can communicate simultaneously with one or more mobile stations 270.

The base station 202 can include a transceiver that includes a base station transmitter 222 and a base station receiver 224. The base station transmitter 222 and the base station receiver 226 are coupled to a base station antenna 226. The base station antenna 226 can be one or more antennas that are configured to support a predefined coverage area, commonly referred to as a cell.

The base station 202 is in communication with the PDE 230. The base station 202 may be in direct communication with the PDE 230 or may communicate with the PDE 230 via intervening equipment, such as base station controllers (BSC) or mobile switching centers (MSC). In other embodiments, a mobile station 270 can open a TCP/IP socket with the PDE 230 and can communicate with the PDE 230 via the base station 202, BSC, MSC, and an Inter-Working Function (IWF) or Packet Switched Data Network (PSDN). In other embodiments, the mobile station 270 can use other methods to communicate with the PDE 230.

The PDE 230 can be configured to perform a portion of, or all of, the position determination methods used to locate a mobile station 270. For example, a position determination module 233 in the PDE 230 can be configured to receive partial location information from the mobile station 270, such as time differences or pilot channel phase offsets, and determine the position of the mobile station 270. The PDE 230 can include an almanac 236 listing the positions of all base stations, for example 202, and repeaters, for example 212, in the communication system 200. The almanac can also include latitude, longitude, time calibration, and other factors for one or more signal sources in the communication system. In addition, the PDE 230 can include a GPS satellite almanac and ephemeris. The PDE 230 can use the information provided by the mobile station 270 in conjunction with the base station almanac and satellite information to determine the mobile station's position. The PDE 230 can implement any number of position determination algorithms, for example, the PDE 230 can determine a GPS position or a position using AFLT based on the information provided by the mobile station 270. In other embodiments, the PDE 230 can determine the position of the mobile station 270 using some other position determination technique or a hybrid combination of position determination techniques.

The PDE 230 can include a processor 234 that is in communication with a memory 232. The memory 232 can, for example, store processor readable instructions that direct the processor 234 to perform a position determination algorithm. Additionally, the memory 232 can be used to store the almanac, the mobile station 270 information, and other information.

The base station 202 can communicate directly with the mobile station 270 or can communicate with the mobile station 270 via the repeater 212. The base station 202 is typically not concerned with whether the communication with the mobile station 270 occurs directly or via the repeater 212. However, as described above, the mobile station 270 needs to identify the source of transmissions in order to correctly determine its position.

The repeater 212 is typically a wireless repeater 212 that communicates with the base station 202 and mobile station 272 via wireless communication channels. However, either or both of the communication links may be wired, wireless, optical, and the like.

When the communication link between the base station 202 and the repeater 212 is a wireless RF communication link, the repeater 212 includes a first antenna 242 to receive the signals from the base station 202. The repeater 212 can also use the first antenna 242 to transmit signals to the base station 202.

The first antenna 242 couples the signals from the base station 202 to a duplexer 214. The duplexer 214 isolates the signals received from the base station 202 from the signals being transmitted by the repeater 212 to the base station 202. The received signal output of the duplexer 214 is coupled to the repeater receiver 244. The receiver 244 can filter and amplify the base station 202 signal. Typically, the receiver 244 does not frequency convert or demodulate the received signal in order to minimize the associated processing delays. However, the repeater 212 is not limited to such a configuration and can be configured to operate with a receiver that filters and amplifies the signal, frequency converts the signal, demodulates the signal, or some combination of signal processing of the signal received from the base station 202.

The output of the receiver 244 is coupled to a Differential Delay Modulator (DDM) 250. The DDM 250 generates two copies of the received signal. One copy is transmitted through the DDM 250 directly and the other copy is delayed before being transmitted through the DDM 250. The delay can be configured to be a predetermined constant delay or can vary with time. Where the delay is constant, the predetermined constant delay may differ for different repeaters.

The output of the DDM 250 is coupled to a transmitter 254. The transmitter 254 is used to transmit the forward link signals. The forward link transmitter 254 can include a single transmitter with two signal paths, or can include two independent transmitters with each transmitter coupled to one of the signal paths from the DDM 250. The forward link transmitter 254 can further amplify and filter the signals provided by the DDM 250. The output of the forward link transmitter 254 typically includes two independent signals, one on-time signal and a delayed version of the on-time signal. The transmitter 254 can amplify the two DDM signals equally or can amplify one signal more than the other signal. Additionally, the amplitude of the on-time signal relative to the delayed version may be a predetermined value. The predetermined value may be a constant or may vary with time.

The output of the forward link transmitter 254 is coupled to a diversity module 260. The diversity module 260 is optional, but is particularly advantageous in CDMA communication systems when the receivers implement a RAKE receiver. The advantages of implementing a diversity module 260 in the repeater 212 will be discussed in further detail in relation to FIGS. 3 and 4. Although the diversity module 260 is shown separate from the forward link transmitter 260 and antenna 246, the diversity module 260 can be implemented in the transmitter 254 or the antenna 246.

The output of the diversity module 260 is coupled to a second duplexer 218 used to isolate the reverse link signals received from the mobile station 270 from the forward link signals transmitted by the repeater 212 to the mobile station 270. The output of the second duplexer 218 is coupled to a second antenna 246. The second antenna 246 is shown as a single antenna, but can be one or more antennas, or can be one or more antennas with one or more antenna feeds.

The second antenna 246 also receives the reverse link signals transmitted by the mobile station 270. The received reverse link signals are coupled to the second duplexer 218. The output of the second duplexer 218 is coupled to a reverse link receiver 215 that filters and amplifies the reverse link signals. The output of the reverse link receiver 215 is coupled to a reverse link transmitter 216 that can further filter and amplify the reverse link signals. The reverse link receiver 215 and the reverse link transmitter 216 can be combined as a single reverse link transmitter. Additional signal processing may occur in each of the reverse link receiver 215 and transmitter 216.

The output of the reverse link transmitter 216 is coupled to the first duplexer 214. The transmit output of the first duplexer 214 is coupled to the first antenna 242 where the reverse link signal is broadcast to the base station 202.

In another embodiment, the repeater 212 can implement distinct forward link and reverse link paths. The duplexers

214 and 218 can be eliminated from the repeater 212 and the forward link path can use antennae that are distinct from antennae used in the reverse link path. In still another embodiment, the forward link transmitter 254 is coupled to multiple antennae. However, the reverse link receiver 215 may be coupled to only one of, or a subset of, the antennae coupled to the forward link transmitter 254.

The mobile station 270 can communicate with the base station 202 and the repeater 212. The coverage areas supported by the base station 202 and the repeater 212 can be overlapping or can be mutually independent. The mobile station 270 can communicate solely with the base station 202, solely with the repeater 212, or with both the base station 202 and the repeater 212. Additionally, the mobile unit 270 can simultaneously communicate with more than one base station, for example 202, and more than one repeater, for example 212.

The mobile station 270 may also be referred to as a terminal, a remote station, a user equipment (UE), an access terminal, a wireless phone, a cellular telephone, a handset, and the like. The mobile station 270 includes an antenna 272 that receives the forward link signals transmitted to the mobile station 270. The antenna 272 can also be used by a transmitter 290 in the mobile station 270 to broadcast reverse link signals.

The received forward link signals are coupled from the antenna 272 to the receiver 274. The forward link signals may include pilot signals that include Pseudo Noise (PN) codes. The receiver 274 typically filters, amplifies, downconverts, and demodulates the received forward link signal. If the receiver 274 is a CDMA receiver, the output of the receiver 274 is coupled to a correlator 276. The correlator 276 can be configured with multiple fingers that are used to independently track multipath signals. Time aligned signal components from the correlator 276 can be summed coherently to improve the signal to noise ratio of the received signal.

The mobile station 270 can use a portion of the demodulated forward link signal in a position determination. The output of the correlator 276 can be coupled to a position determination module 278. The position determination module 278 can be configured to perform a portion of, or all of, the position determination for the mobile station 270. In one embodiment, the position determination module 278 determines the PN code offset from the pilot signals that are received from one or more base stations, for example 202. The PN offsets are determined using a clock synchronized to system time. The PN offsets can represent pseudoranges to the signal sources. The mobile station 270 communicates the base station identities and the PN offsets to the PDE 230 via the mobile station transmitter 290. The PDE 230 can then determine the position of the mobile station 270. In another embodiment, the mobile station 270 can download the base station almanac from the PDE 230. Then, the mobile station can determine the PN offset for one or more base stations, e.g. 202, and, having previously downloaded the base station almanac, determine the mobile station position without the assistance of the PDE 230.

The mobile station 270 also includes a processor 282 in communication with memory 284. The processor can be in communication with the correlator 276 and the position determination module 278 and may perform some or nearly all of the functions performed by the correlator 276 or position determination module 278. The memory 284 can include processor readable instructions that direct the processor 282 to perform desired functions related to the correlator 276, position determination module 278, or some other module within the mobile station 270.

When the mobile station 270 is within a coverage area supported only by the base station 202, the mobile station 270 will not detect a delayed component corresponding to a repeater delay. The mobile station 270 can then determine that the signal originated from the base station 202 and use the location of the base station 202 for position determination.

When the mobile station 270 is within the coverage area supported only by the repeater 212, the mobile station 270 will detect both the on-time repeated signal as well as the delayed version of the repeated signal. The mobile station 270 can then determine that the signal originated from a repeater, for example 212, and use the location of the repeater 212 for position determination.

If the mobile station 270 is able to receive signals from both the base station 202 as well as the repeater 212, the mobile station 270 may be able to determine that it is receiving signals from one or both signal sources. That is, the receive signal strength from each source may be sufficient for the mobile station 270 to identify both signal sources. The mobile station 270 can use either or both of the received signals in position determination.

Figure 3:
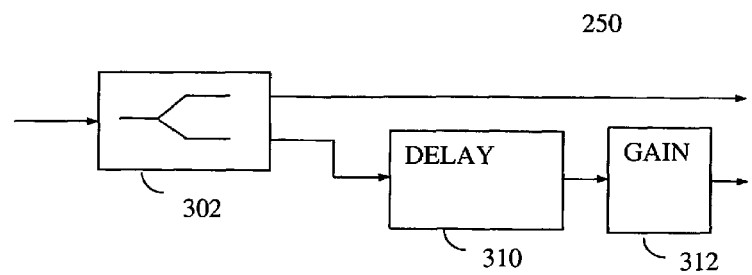
FIG. 3 is a functional block diagram of a differential delay modulation module.

FIG. 3 is a functional block diagram of one embodiment of a DDM 250, such as the DDM 250 shown in the repeater 212 of FIG. 2. The input signal to the DDM 250 is coupled to the input of a signal splitter 302. The signal splitter 302 can be, for example, a power divider, directional coupler, magic Tee, hybrid, and the like, or some other means for splitting a signal. The signal splitter 302 can be a 3-dB power divider or can split the amplitudes unequally.

A first output of the signal splitter 302 is coupled to the output of the DDM 250 with substantially no delay. Substantially no delay refers to a delay that is less than the delay on the delayed path of the DDM 250. The signal from the signal splitter that experiences substantially no delay is referred to as the on-time signal from the DDM 250.

A second output of the signal splitter 302 is coupled to an input of a delay module 310. The delay module 310 can be an analog delay module or can be a digital delay module. The delay module 310 can also be implemented as a delay line, tapped transmission line, filter, register, buffer, and the like, or some other means for delaying a signal.

In one embodiment, each repeater associated with a base station is assigned a unique delay function or delay signature. This enables a mobile station to determine which repeater is the source of received signals. The number of available delay functions, or delay signatures, may be limited. That is, the system may only provide a predetermined number of delay functions. Limiting the number of delay functions used in the system limits the space over which a mobile station needs to search to determine the source of received signals. For example, a communication system may allocate one of a possible sixty-four delay signatures to a repeater. Then, a mobile station need only search a maximum of sixty-four delay signatures to identify the repeater.

In an alternative embodiment, the system can provide aiding information to the mobile station to further minimize the time space searched by the mobile station. For example, suppose the wireless communication system again provides a maximum of sixty-four possible delay signatures. Also suppose that one base station is associated with two repeaters. A first repeater is assigned a first delay function, which may be any one of the delay signatures. A second repeater is assigned a second delay function, which also may be any of the delay signatures except for the delay signature assigned to the first repeater. The wireless communication system could then provide aiding information to any receiver within the coverage area of the base station or its repeaters. The aiding information can include a list of repeaters associated with the base station and the delay signatures associated with the repeaters. The mobile station receiving the aiding information can then limit the search space to coincide with the two identified delay signatures plus the zero delay associated with the base station.

In one embodiment, the list of repeaters associated with base stations and the corresponding delay signatures are stored in the PDE. The list of delay signatures for repeaters associated with the base station could then be provided to the mobile station when the base station is identified in the active or neighbor list in the mobile phone. The aiding information can identify the particular delay signature and need not directly identify the delay. For example, the aiding information can inform the mobile station that two repeaters are associated with a base station. One repeater may be identified as using delay signature $D_4$ while the other repeater is identified as using delay signature $D_7$. The overhead associated with providing the aiding information is minimal and does not significantly impact the communication bandwidth of the system.

The delay module 310 can introduce a predetermined constant delay. In a CDMA communication system, the delay introduced by the delay module 310 can be from fractions of a chip to hundreds of chips. However, to complement the use of RAKE receivers in the mobile stations, such as 270, the delay introduced by the delay module is typically greater than 1½ chips in duration. For example, a fixed delay introduced by a delay module can be approximately 1, 1.5, 2, 4, 5, 8, 10, 15, 20, 25, 30, 40, 50, 60, 70, 80, 90, 100, 150, 200, 250, 300, or some other number of chips in duration.

The maximum delay introduced by the DDM 250 is unlimited, but is typically bound by system design constraints. For example, the delay is typically less than a PN code length. The delay is also typically less than a typical limit for coherently combining fingers of a RAKE receiver. The upper delay limit can be, for example, 300 chips.

Similarly, a minimum delay introduced by the DDM 250 may only be limited by the ability of the receiver to distinguish delay paths. However, in practical applications, the minimum delay may be selected to be greater than a maximum predicted delay attributable to multipath. The maximum delay attributable to multipath can vary according to a number of factors, including the terrain surrounding the repeater. Thus, the minimum delay can be fixed for all repeaters or can be different for different repeaters. For example, the minimum delay can be 1.5, 10, 15, 20, or 30 chips or some other period.

Alternatively, the delay module 310 can implement a time varying delay. The delay function can, for example, vary about a predetermined delay constant. For example, a delay function may nominally have a delay of 20 chips but periodically vary up to 21 chips and down to 19 chips. The delay variation may be a smooth function, such as a ramp or sinusoidal function, or may occur over a predetermined number of fixed increments. The delay variation advantageously varies at a rate that enables a tracking loop within the mobile station to stay locked on the signal. Thus, in one embodiment, the delay function varies at a rate that is less than a loop bandwidth of the mobile station tracking loop.

The output of the delay module 310 is coupled to a gain stage 312. The gain stage 312 is used to vary the amplitude of the delayed signal relative to the on-time signal. The gain stage 312 can implement a positive gain, a negative gain, or no gain. The gain stage 312 can be, for example, an amplifier, an attenuator, and the like, or some other means for adjusting gain. Of course gain stage 312 is not limited to being positioned after the delay module 310. In other embodiments, the gain stage 312 is implemented in the on-time signal path or in the delayed signal path prior to the delay module 310. In still other embodiments, the gain stage 312 is incorporated in one output of the signal splitter 302 or in the delay module 310.

Figure 4A:
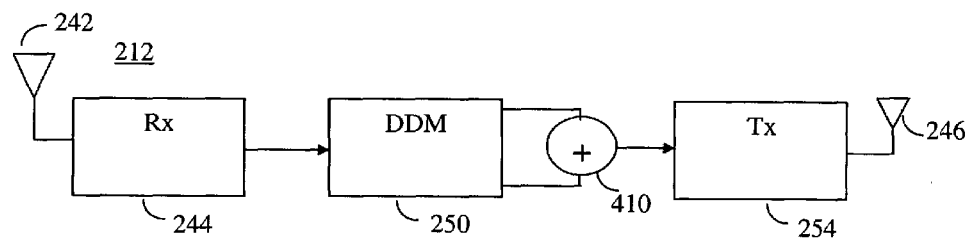
FIGS. 4A-4C are functional block diagrams of repeaters having differential delay modulation modules.
Figure 4B:
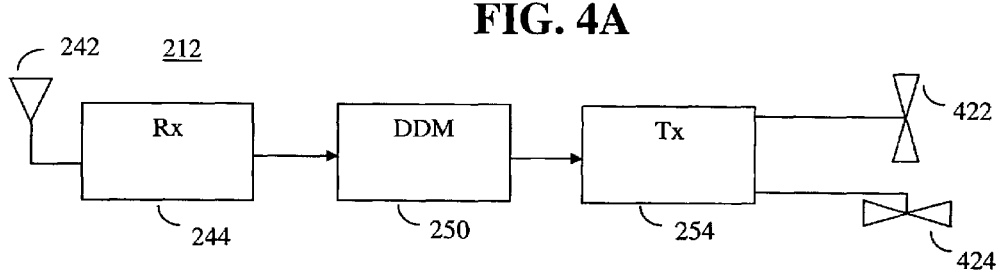
Figure 4C:
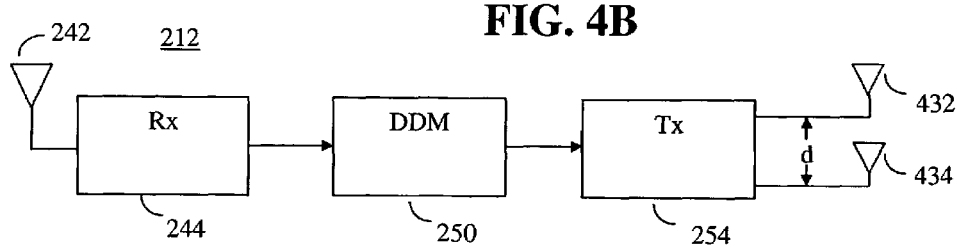

FIGS. 4A-4C are functional block diagrams of various repeater 212 embodiments. The repeater 212 embodiments shown in FIGS. 4A-4C omit the duplexers and reverse link functional blocks for the sake of clarity. Some of the repeater 212 embodiments include signal diversity. FIG. 4A is a functional block diagram of a repeater 212 that does not include the diversity module 260 shown in FIG. 2.

The repeater 212 includes a first antenna 242 coupled to a receiver 244. The output of the receiver 244 is coupled to the DDM 250. The DDM 250 generates two signal outputs, an on-time signal output and a delayed signal output. Because the repeater 212 in FIG. 4A does not implement signal diversity, there is no need to maintain two separate signal paths. Thus, the on-time and delayed signals from the DDM 250 are coupled to a signal combiner 410 shown as a signal summer. The signal combiner 410 sums the on-time and delayed signals into a single composite signal.

The combined signal is coupled from the output of the signal combiner 410 to the transmitter 254. The output of the transmitter 254 is coupled to the second antenna 246 where the repeater signal is broadcast. The transmitter 254 can be a single path transmitter and need not have two distinct signal paths. Alternatively, the transmitter 254 can implement two signal paths and be placed following the DDM 250 and prior to the signal combiner 410.

The repeater 212 of FIG. 4A allows the mobile station to identify the signal source by including differential delay modulation 250. However, the lack of signal diversity in the output of the repeater signal can lead to inefficient use of resources in a CDMA RAKE receiver.

In a CDMA RAKE receiver, a searcher assigns fingers to each of the detected signal paths. Thus, the searcher in the mobile station receiver will assign one or more fingers to the on-time and delayed signals from the repeater 212. However, the fading experienced by the signal on the delayed signal path will likely be highly correlated with the fading experienced by the on-time signal path. The resultant combination of the signals from the fingers results in the coherent combination of signal but also results in combination of highly correlated noise signals. Thus, the combination of the on-time signal with the delayed signal in the RAKE receiver yields no diversity gain. There may be a penalty in a forward link inner power control loop estimation in that the received signal quality may be consistently overestimated. The overestimate in signal quality may then lead to degraded power control performance.

One solution to the degraded power control performance is for the mobile station to deassign fingers that are assigned to the delayed signal paths once the mobile station determines that the signal originates from a repeater, for example 212. However, legacy phones that have no knowledge of repeaters 212 having differential delay modulation are unable to take advantage of this solution.

FIG. 4B is another functional block diagram of a repeater 212. The repeater 212 of FIG. 4B includes signal diversity and thus, the mobile station utilizing a RAKE receiver does not suffer the signal degradation as in the embodiment where the repeater 212 does not implement signal diversity.

As before, the repeater 212 includes a first antenna 242 that is coupled to a receiver 244 that is in turn coupled to a DDM 250. The DDM 250 outputs the on-time signal and the delayed signal. The two signals from the DDM 250 are coupled to a transmitter 254.

The output of the transmitter 254 is coupled to a diversity module that includes two transmit antennae 422 and 424. The on-time signal is coupled to a first transmit antenna 422 and the delayed signal is coupled to a second transmit antenna 424. The first transmit antenna 422 is polarized differently than the second transmit antenna 424. For example, the first transmit antenna 422 is depicted as having vertical polarization, while the second transmit antenna 424 is depicted as having horizontal polarization. Diversity between the on-time and delayed signals transmitted by the repeater 212 is incorporated by introducing substantially orthogonal antenna polarization. The two antennae polarizations typically ensure that fading diversity is experienced by the signals prior to their arrival at the mobile station. Thus, the repeater 212 introduces synthetic path diversity through the use of substantially orthogonal antennae polarizations.

Thus, comparing the functional block diagram of FIG. 4B to the functional block diagram of FIG. 2, the diversity module and second antenna, 260 and 246 from FIG. 2, are implemented as the two transmit antennae 422 and 424 shown in the embodiment of FIG. 4B. Although FIG. 4B shows two transmit antennae 422 and 424, orthogonal polarizations can be implemented with a single antenna, for example 422. An antenna can, for example, include multiple orthogonal feeds.

FIG. 4C is a functional block diagram of still another embodiment of a repeater 212. The repeater 212 includes a first antenna 242 coupled to a receiver 244 that is in turn coupled to a DDM 250. The on-time and delayed signals are coupled from the DDM 250 to a transmitter 254. The output signals from the transmitter 254 are coupled to first and second transmit antennae 432 and 434. The first and second transmit antennae, 432 and 434 respectively, may have the same or different polarizations. Diversity is introduced into the repeater 212 signal by spatially separating the first transmit antenna 432 from the second transmit antenna 434. The first antenna 432 may be separated from the second antenna by a distance 'd' sufficient to introduce spatial diversity. For example, the distance 'd' may be proportional to .lambda., where .lambda. represents a wavelength of a frequency in the forward link band. The frequency may be, for example, the center frequency of the band. However, the repeater 212 can use a combination of techniques to introduce diversity in the signals and is not limited to using different antenna polarizations or spatially separated antennae.

The delay function in the DDM 250 induces a low cross-correlation between the original and delayed signals due to the cross-correlation properties of the CDMA PN spreading code. Therefore, the repeater 212 generates synthetic path diversity for the mobile station. This is similar to orthogonal transmit diversity (OTD) or space time transmit diversity (STS) that can be employed in cdma2000 base stations. Instead of using Walsh codes to orthogonalize two synchronous transmitted signals, the repeater uses the cross-correlation properties of the CDMA PN code to provide pseudo-orthogonality between the asynchronous transmitted signals.

However, the pseudo-orthogonality assumption breaks down for line of sight and high geometry scenarios where the channel is closer to Additive White Gaussian Noise (AWGN). In such cases there will be noticable path interference that is not experienced for STS and OTD. To mitigate this interference, the delayed signal in the repeater 212 can be attenuated relative to the on-time signal. Equal gains between the antennae are desirable for fading scenarios, but a relative amplitude difference is desirable for AWGN cases. The relative antenna gains, or signal gains, can be optimized to balance this trade-off.

Because single path, slow speed fading mobile stations are the dominant power consumers in cellular networks, equal gain transmitters providing diversity drive down the power for those cases. The equal gain implementation accepts some degradation for the high geometry and AWGN situations.

The repeater 212 generates independently fading paths, which improves mobile station performance in repeater coverage areas instead of degrade performance for the majority of scenarios. The fingers of a mobile station RAKE receiver can now be assigned to on-time and delayed repeater signal paths and thus the receiver experiences a diversity gain. Power control will function properly because of the low noise correlation. Legacy phones will also experience a diversity gain although some will not be able to identify repeater 212 as the signal source.

The net result is that forward link capacity may be improved in repeater coverage areas. This is because mobile stations which once detected only 1 path will now detect 2, and similarly 2 path scenarios become 4 path scenarios. With increased diversity, mobile stations typically require less forward link transmit power, resulting in higher link capacity.

Figure 5:
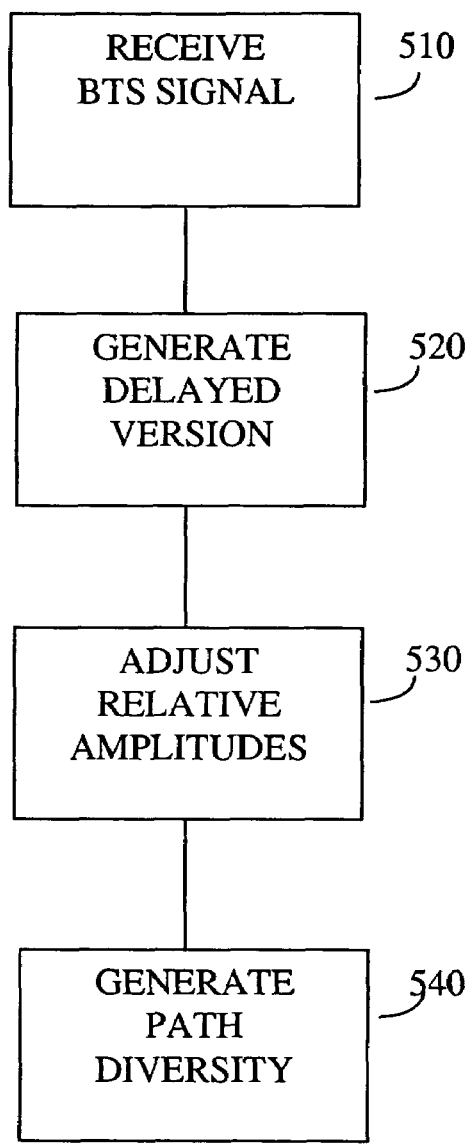
FIG. 5 is a flowchart of a method of repeating a communication signal.

FIG. 5 is a flowchart of one method 500 for generating repeater signals in a wireless communication system. The method 500 begins at block 510 where the repeater, such as 212, receives the BTS signals. A repeater in a CDMA wireless communication system can receive the forward link signals from a base station.

The repeater then proceeds to block 520 where the repeater generates a delayed version of the received signal. The repeater can use, for example, a delay line or some other means for delaying the signal. The delay can be, for example, fractions of a CDMA chip period or can be multiples of a CDMA chip period.

The repeater then proceeds to block 530 where the amplitude of the non-delayed, or on-time signal, is adjusted relative to the amplitude of the delayed signal. The repeater may adjust the amplitudes such that the amplitudes are substantially equal or can adjust the amplitude of one signal to be greater than the amplitude of the other signal. The amplitude of the on-time signal can be greater than the amplitude of the delayed signal or the opposite can be implemented. The amplitudes can be adjusted at almost any stage of the repeater.

The repeater then proceeds to block 540 where the repeater generates path diversity for the signals. The repeater can generate path diversity using, for example, two antennae having different polarizations or two antennae that are spatially separated. The two signals are then transmitted by the repeater.

The diversity advantage from a CDMA performance perspective can be a disadvantage from a repeater identification perspective. Identification of the repeater signature function relies on detection of both the original on-time path as well as the delayed path. Because the on-time and delayed paths fade in an uncorrelated manner, it is possible that only one of the two paths is detected by a mobile station while the other signal is experiencing a deep fade. This problem does not occur in the DDM repeater shown in FIG. 4A because both the on-time and delayed signals fade identically.

Thus, a mobile station will be unable to identify the source as a repeater under conditions where one of the repeater signals is experiencing a deep fade. While uncorrelated fading represents a penalty that can degrade repeater identification, this penalty is mitigated in several ways.

The AFLT search algorithm resident in a CDMA mobile station can maintain a history of pilot phase measurements for each detected PN code. Thus, the mobile station may measure either the original and/or delayed pilots at one instance and later may re-measure them possibly filling pilots at previously undetected delays. Over time, the measurement database is populated with all dominant measurements of the pilot at various delays. In this manner, there is a good chance that the database will eventually contain both the original on-time pilot and delayed pilot. The probability is high particularly for pilots having stronger energy per chip to interference Ec/Io levels. The stronger pilots are typically the pilots most important in AFLT and hybrid position determination solutions.

Because strong pilots may be of greatest interest in AFLT and hybrid position determination solutions, the following algorithm, shown as pseudo-code, can be adopted at the PDE for a given PN pilot phase measurement:

```
if ( BTS does not have any repeaters )
    use pilot with BTS sector lat/long
else if ( mobile detected this pilot to be from
    a specific repeater [given a desired Pfa] )
    use pilot with identified repeater lat/long
else if ( pilot Ec/Io > strong_threshold )
    # if pilot is this strong and wasn't detected to be a
    # repeater, assume this pilot must be from the BTS
    # (non-repeated)
    use pilot with BTS sector lat/long
else
    discard pilot
end
```

If the pilot is from a base station without any repeaters then there is no ambiguity as to the point of signal transmission. If the base station has one or more repeaters and the mobile has flagged the measurement to be from a repeater and has identified the specific repeater signature then the measured PN offset and repeater location are used in position determination. The PDE may also require that the mobile station has identified the repeater with some predetermined level of probability of false alarm or Pfa. The Pfa can be set to a relatively low value such that a repeater identification can be assumed to be trustworthy.

However, if the mobile station fails to identify a repeater, the PDE is unable to determine if the measurement came from the base station or one of the repeaters. In this case, if the signal is "strong", then the base station location can be assumed to be the point of signal transmission. The rationale being that a strong signal from a repeater would result in a high probability of positive repeater identification. If, alternatively, the signal is weak, then the pilot is discarded. The determination of whether a signal is strong or weak can be made by comparing received Ec/Io against a predetermined threshold.

With the above mitigation in mind, it is appropriate to consider the performance in networks with legacy repeaters. Since legacy repeaters do not implement DDM and the Pfa design parameter is set low, it is very unlikely that the mobile will detect a repeater signature. Nevertheless, a repeater pilot may be "strong". To avoid flagging such a measurement as a valid base station PN offset measurement, the PDE could maintain in its base station almanac information for each repeater in the network. For a base station with legacy repeaters, the almanac could flag the existence of one or more legacy repeaters. For a base station with repeaters implementing differential delay modulation, the almanac could to maintain a list of repeaters with their latitudes, longitudes, time calibrations, delay signature functions, and the like. If pilot offset measurements are reported for a base station PN with one or more legacy repeaters, then the measurements will be discarded and will not be used for position determination.

Figure 6:
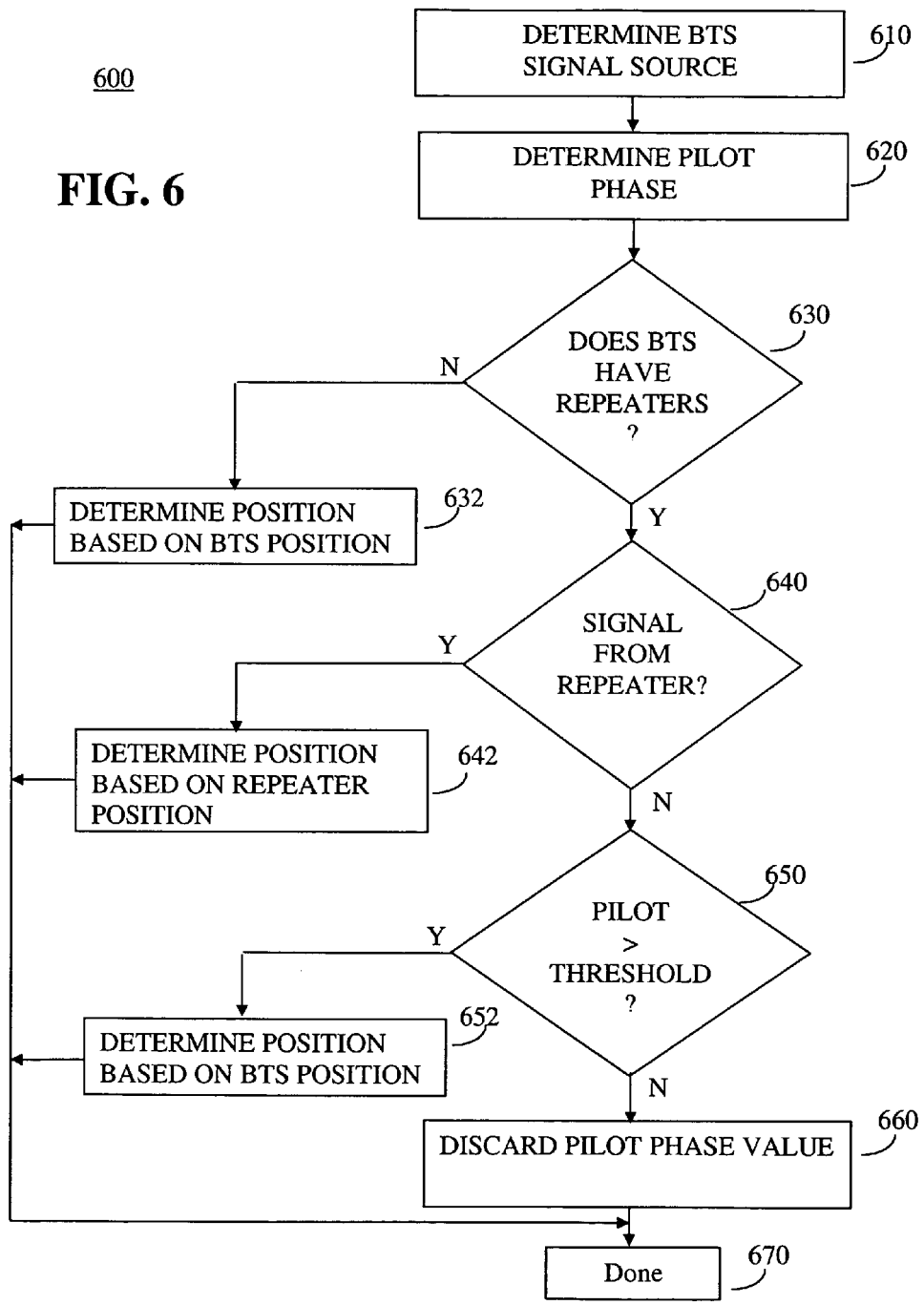
FIG. 6 is a flowchart of a method of position determination in a communication system having repeaters.

A flowchart of a method for determining a signal source in a wireless communication system having repeaters associated with base stations is shown in FIG. 6. The method can be implemented in for example, PDE or a mobile station. For example, in a mobile assisted position determination system, the mobile station may communicate pseudo-range information or other information correlative to position to the PDE. The PDE can then determine the position of the mobile station. Alternatively, the mobile station can include an almanac of signal sources and the mobile station can independently determine its position from pseudo-ranges. The method details signal source determination in a wireless communication system, such as a CDMA communication system. However, the method is not limited to a particular system.

The flowchart will be discussed as if performed by the PDE in a CDMA wireless communication system. However, as noted earlier, the method is not limited to implementation in the PDE. The method begins in block 610 where the PDE determines which base station originated the signal. The PDE can determine that the signal originated from a particular base station based in part on information provided by a mobile station.

The PDE then proceeds to block 620 where the PDE determines the pilot phase. The mobile station can communicate to the PDE a PN offset from a particular base station. Because the phase offset correlates to a propagation delay, the pilot phase can be interpreted as a pseudo-range measurement.

The PDE then proceeds to decision block 630 where the PDE determines if the originating base station has any associated repeaters. The PDE can determine the existence of repeaters by reference to an almanac having the information. The almanac can be, for example, stored in memory in the PDE.

If the base station does not have any repeaters, the signal received by the mobile station originated at the base station. Thus, the PDE proceeds to block 632 and determines the mobile station position, if possible, based in part on the position of the base station.

If the base station is associated with one or more repeaters, the PDE proceeds to decision block 640 where the PDE determines if the mobile station has identified the signal as being relayed by a repeater. The mobile station may indicate in a message to the PDE that the signal was transmitted by a repeater. The mobile station may, for example, determine that the delay signature indicates the signal source was a repeater. Additionally, the Ec/Io received by the mobile station may be greater than a predetermined threshold value, such as a predetermined probability of false alarm.

If the signal is determined to have been transmitted by a repeater, the PDE proceeds to block 642 where the PDE uses the repeater position as a factor in determining the mobile station position.

Alternatively, if the signal is not determined to have been transmitted by a repeater, the PDE proceeds to decision block 650. In decision block 650, the PDE determines if the received pilot signal is a strong pilot signal. The PDE can make the determination, for example, by comparing the pilot Ec/Io to a predetermined threshold. The PDE analyzes the Ec/Io after determining the base station does not have legacy repeaters that do not implement differential delay modulation.

If the pilot Ec/Io is greater than the threshold, the probability is high that the signal source was a base station. The PDE proceeds to block 652 and the PDE determines the position of the mobile station, in part, based on the position of the base station.

However, if the pilot Ec/Io is less than or equal to the threshold, the pilot signal is not a strong pilot signal and the PDE is unable to determine if the signal source was a base station or a repeater having one of the signal paths in a deep fade. Additionally, if the base station includes legacy repeaters, the PDE defaults to a weak pilot signal. The PDE then proceeds to block 660 where the pilot phase value is discarded and not used in determining the position of the mobile station.

Thus, a repeater that is advantageous for use in forward link signal paths of wireless communication systems is disclosed. The repeater allows for repeater identification and enhances CDMA forward link capacity in its area of coverage with minimal, if any, impact on forward link channel capacity. Repeater identification can be used for ambiguity resolution in order to render AFLT pilot phase measurements in AFLT or hybrid position determination solutions, or for network loading analysis.

Electrical connections and couplings have been described with respect to various devices or elements. The connections and couplings may be direct or indirect. A connection between a first and second device may be a direct connection or may be an indirect connection. An indirect connection may include interposed elements that may process the signals from the first device to the second device.

Signal or process flows have been described with respect to various processes, methods, or flowcharts. The flow from one step or block to the next may be direct or indirect. An indirect connection may include interposed blocks that may process the signals from the one block prior to a subsequent block. Additionally, the arrangement of the blocks or steps shown in the FIGURES is not necessarily an indication of order. The blocks, processes, steps, or methods may, in some instances, be re-ordered without affecting results of the process or methods.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A repeater comprising:
   a differential delay modulator configured to receive a repeater signal and generate an on-time signal and a delayed signal that is delayed from the on-time signal responsive to a predetermined delay function that identifies the repeater; and
   a transmitter coupled to the differential delay modulator and configured to wirelessly transmit the on-time signal and the delayed signal to a mobile station.

2. The repeater of claim 1, wherein the transmitter comprises:
   a first antenna configured to broadcast the on-time signal; and
   a second antenna configured to provide path diversity relative to the first antenna, and configured to broadcast the delayed signal.

3. The repeater of claim 2, wherein the first antenna has a polarization that is substantially orthogonal to a polarization of the second antenna.

4. The repeater of claim 2, wherein the first antenna is spatially separated from the second antenna by a distance sufficient to provide spatial path diversity.

5. The repeater of claim 1, wherein the predetermined time delay function is an approximately constant delay.

6. The repeater of claim 1, wherein the predetermined time delay function comprises a variable delay.

7. A repeater comprising:
   a differential delay modulator configured to wirelessly receive a forward link signal from an associated base station, and further configured to generate an on-time signal and a delayed signal based on the forward link signal, the delayed signal configured to be delayed from the on-time signal responsive to a predetermined delay function that identifies the repeater;
   a first antenna coupled to the differential delay modulator and configured to broadcast the on-time signal; and a second antenna coupled to the differential delay modulator and configured to broadcast the delayed signal.

8. The repeater of claim 7, wherein the first antenna has a polarity that is substantially orthogonal to a polarity of the second antenna.

9. The repeater of claim 7, wherein the first antenna is spatially separated from the second antenna by a distance proportional to $\lambda$, where $\lambda$ denotes a wavelength of a frequency of the forward link signal.

10. The repeater of claim 7, wherein the differential delay modulator comprises:
a signal splitter having an input and first and second outputs; and
a delay module coupled to a second output of the signal splitter and configured to output the delayed signal.

11. The repeater of claim 10, wherein the forward link signal is a CDMA forward link signal and the delay module is configured to introduce a delay-of a duration greater than a maximum delay attributable to multipath.

12. The repeater of claim 10, wherein the forward link signal is a CDMA forward link signal and the delay module is configured to introduce a delay of a duration greater than 1.5 chips.

13. The repeater of claim 7, wherein the predetermined time delay function is an approximately constant delay.

14. The repeater of claim 7, wherein the predetermined time delay function comprises a variable delay.

15. A repeater comprising:
means for receiving a CDMA forward link signal from a base station associated with the repeater;
means for splitting the forward link signal to generate a first output signal and a second output signal;
means for delaying the second signal output to generate a delayed signal output that is delayed from the on-time signal responsive to a predetermined delay function that identifies the repeater; and
means for broadcasting the first output signal and the delayed output signal.

16. The repeater of claim 15, wherein the means for delaying the second output signal comprises means for introducing a predetermined constant delay.

17. The repeater of claim 15, wherein the means for delaying the second signal comprises means for introducing a variable delay.

18. The repeater of claim 15, wherein the means for broadcasting the first output signal and the delayed output signal comprises:
a first antenna configured to broadcast the first output signal; and
a second antenna, configured to introduce path diversity relative to the first antenna, and configured to broadcast the delayed output signal.

19. A method of repeating a signal in a wireless communication system, the method comprising:
wirelessly receiving a signal;
generating an on-time version of the signal;
generating a delayed version of the signal, including delaying the on-time version of the signal responsive to a predetermined delay function that identifies the repeater;
introducing path diversity between the on-time version of the signal and the delayed version of the signal; and
wirelessly transmitting the on-time version of the signal and the delayed version of the signal.

20. The method of claim 19, wherein introducing path diversity comprises:
coupling the on-time version of the signal to a first antenna having a first polarity; and
coupling the delayed version of the signal to a second antenna having a polarity substantially orthogonal to the first polarity.

21. The method of claim 19, wherein introducing path diversity comprises:
coupling the on-time version of the signal to a first antenna having a first polarity; and
coupling the delayed version of the signal to a second antenna spatially separated from the first antenna by an amount sufficient to introduce spatial diversity.

22. The method of claim 19, wherein generating the delayed version of the signal comprises generating the delayed version of the signal using a fixed delay.

23. The method of claim 19, wherein generating the delayed version of the signal comprises generating the delayed version of the signal using a variable delay.

24. The method of claim 19, wherein wirelessly receiving the signal comprises wirelessly receiving a forward link signal from a base station, the forward link signal including aiding data identifying a delay used by a repeater associated with the base station.

25. The method of claim 19, further comprising prior to wirelessly transmitting theon-time version of the signal and the delayed version of the signal, adjusting an amplitude of the on-time version of the signal relative to an amplitude of the delayed version of the signal.

26. The method of claim 25, wherein adjusting the amplitude of the on-time version of the signal comprises adjusting the amplitude of the on-time version of the signal to be greater than the amplitude of the delayed version of the signal.

27. The method of claim 25, wherein adjusting the amplitude of the on-time version of the signal comprises adjusting the amplitude of the on-time version of the signal to be less than the amplitude of the delayed version of the signal.

28. The method of claim 25, wherein adjusting the amplitude of the on-time version of the signal comprises adjusting the amplitude of the on-time version of the signal to be substantially equal to the amplitude of the delayed version of the signal.

29. A wireless communication system having position determination capabilities, the wireless communication system comprising:
a base station configured to wirelessly transmit forward link signals and wirelessly receive reverse link signals;
a repeater configured to wirelessly receive, differentially delay modulate, and wirelessly transmit the forward link signal the differential delay modulation being configured to implement a predetermined delay function that identifies the repeater; and
a position determination entity (PDE) in communication with the base station, and configured to determine a position of a mobile station based in part on the location of the repeater if the mobile station identifies the repeater as a signal source.

30. The wireless communication system of claim 29, wherein the forward link signal includes aiding data identifying the delay function used by the repeater.

31. The wireless communication system of claim 29, wherein the repeater comprises:
a signal splitter having an input and first and second outputs; and
a delay module coupled to a second output of the signal splitter and configured to output the delayed signal that identifies the repeater.

32. The wireless communication system of claim 29, wherein the delay function is unique for a plurality of repeaters associated with the base station.

33. The wireless communication system of claim 29, wherein the delay function comprises a fixed delay.

34. The wireless communication system of claim 29, wherein the delay function comprises a variable delay.

35. The wireless communication system of claim 29, wherein the forward link signal includes aiding data identifying the delay function used by the repeater, and wherein the repeater comprises:
- a signal splitter having an input and first and second outputs; and
- a delay module coupled to a second output of the signal splitter and configured to output the delayed signal that identifies the repeater.

36. A method of position determination in a wireless communication system having one or more repeaters, the method comprising:
- determining a base station associated with a pilot signal;
- determining a pilot signal phase offset;
- determining if a repeater is associated with the base station, including searching for a delayed signal following the pilot signal, and in the absence of a delayed signal, determining that a repeater is not associated with the base station; and
- determining a position based in part on the location of the base station if the base station is not associated with the repeater.

37. The method of claim 36, further comprising:
- determining if the pilot signal was transmitted by the repeater, including identifying the repeater responsive to a predetermined delay function; and
- determining the position based in part on the location of the repeater if the base station is associated with the repeater.

38. The repeater of claim 37, wherein the predetermined time delay function is an approximately constant delay.

39. The repeater of claim 37, wherein the predetermined time delay function comprises a variable delay.

40. The method of claim 37, further comprising:
- determining if the pilot signal is a strong pilot signal; and
- discarding the pilot signal offset from a position determination if the pilot signal is not the strong pilot signal.

41. One or more processor readable storage devices having processor readable code embodied on the processor readable storage devices, the processor readable code for programming one or more processors to perform a method of position determination in a wireless communication system having one or more repeaters, the method comprising:
- determining a base station associated with a pilot signal;
- determining a pilot signal phase offset;
- determining if a repeater is associated with the base station including searching for a delayed signal following the pilot signal, and in the absence of a delayed signal determining that a repeater is not associated with the base station; and
- determining a position based in part on the location of the base station if the base station is not associated with the repeater.

42. The one or more processor readable storage devices of claim 41, wherein the one or more processor readable storage devices is implemented in a mobile station.

43. The one or more processor readable storage devices of claim 41, wherein the one or more processor readable storage devices as implemented in a position determination entity (PDE).

* * * * *

UNITED STATES PATENT AND TRADEMARK OFFICE
CERTIFICATE OF CORRECTION

PATENT NO. : 7,580,672 B2  Page 1 of 1
APPLICATION NO. : 10/637950
DATED : August 25, 2009
INVENTOR(S) : Douglas Neal Rowitch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 940 days.

Signed and Sealed this

Fourteenth Day of September, 2010

David J. Kappos
*Director of the United States Patent and Trademark Office*